Nov. 26, 1935.  A. T. HUGHES  2,022,203

STATIC PRESSURE INDICATING DEVICE

Filed Nov. 27, 1933

Inventor:
A. T. Hughes

Patented Nov. 26, 1935

2,022,203

UNITED STATES PATENT OFFICE 2,022,203

STATIC PRESSURE INDICATING DEVICE

Albert Thomas Hughes, Brussels, Belgium

Application November 27, 1933, Serial No. 700,002
In Belgium December 7, 1932

4 Claims. (Cl. 265—47)

This invention relates to devices for indicating static pressure in which the pressure to be indicated is transmitted to a pressure gauge by a practically incompressible fluid enclosed within a flexible container and has for its object to provide an improved device of this kind, whereof the indications may be read easily at all times without interference from any deformation or oscillation of its component members.

The static pressure indicating device according to the present invention comprises a flexible container filled with a practically incompressible fluid and enclosed within a rigid casing consisting of two cup-shaped members adapted to reciprocate or telescope within each other, each of said cup-shaped members accommodating a portion of the flexible container and the container being connected with a pressure gauge. Pressure exerted upon said telescopic casing is transmitted to the pressure gauge by the fluid enclosed within the flexible container and, owing to the practical incompressibility of said fluid, practically no relative motion will take place between the telescoping members of the casing.

The pressure gauge is preferably fitted directly upon the telescoping casing but it may, if desired, be remote therefrom and be connected therewith by means of a non-deformable, fluid-filled duct.

In one constructional embodiment of my invention, the flexible container and rigid, telescopic casing are of annular shape, and may therefore be threaded upon a rod, for example, bridging the space between two members whereof one or the other exerts the pressure to be recorded. The device may of course be given any other suitable shape and the telescopic casing may, if desired, be formed in or by members of the machine to which the device is to be adapted.

Likewise, the flexible container may be so constructed if desired, that one or more walls thereof is or are constituted by the inner surface of the corresponding member or members of the rigid, telescopic casing.

Preferably, the inner, flexible container is made of resilient material, such as India rubber or the like. The fluid filling said flexible container may be a liquid, a viscous or plastic substance or, if desired, a gas compressed to such a degree as to render the same practically incompressible under normal working conditions.

In order that the invention may be more readily understood, a constructional embodiment thereof will now be described, by way of example, with reference to the accompanying drawing wherein.

Figure 1:
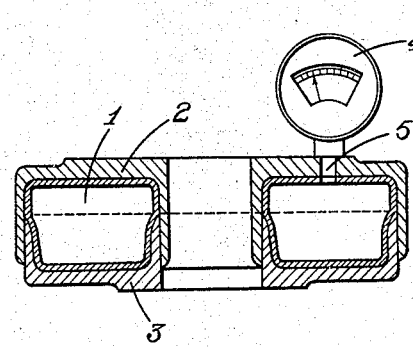
Fig. 1 is a diametral cross section of an annular pressure-indicating device, on line I—I of Fig. 2.
Figure 2:
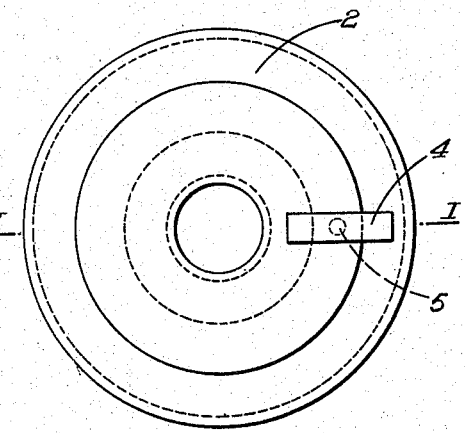
Fig. 2 is a corresponding plan view thereof.

With reference to the drawing, the flexible container, filled with water, oil or other suitable fluid or matter, consists of an annular India rubber tube 1, and the rigid casing comprises two annular cup-shaped members 2, 3, made of metal, fitted within one another so as to enclose said annular tube 1, and adapted to be displaced telescopically. As shown the inner and outer walls of the inner annulus are of tapered cross-section. To the upper cup-shaped member 2 is fitted a pressure gauge 4 placed, by means of a tube 5, in fluid-tight communication with the inner, fluid-filled space of the flexible container 1.

Figure 3:
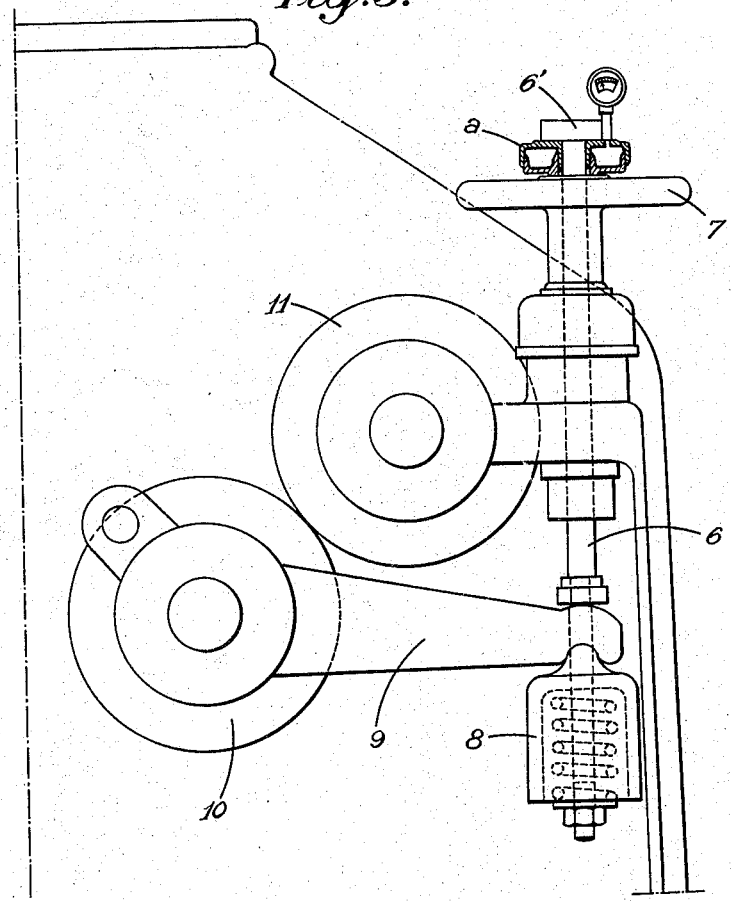
Fig. 3 shows diagrammatically a device according to the invention mounted on a roller-mill.

In Fig. 3, the whole of the annular pressure indicating unit $a$ is threaded upon the rod 6 of the pressure regulating mechanism of a roller mill, between the head 6' of said rod and the regulating hand-wheel 7. Usually, said hand-wheel acts directly upon the rod head 6', and thereby regulates, through rod 6, shock absorber 8 and lever 9, the degree of pressure exerted by the adjustable roll 10 upon the stationary roll 11. In the constructional embodiment illustrated, the indicating unit $a$ therefore acts as a pressure transmitting member, incorporated in the pressure regulating mechanism. Being incompressible itself, it has no influence whatever upon the conditions under which pressure is conveyed to the rolls, but is adapted to indicate the pressure obtaining at any moment between said rolls.

The pressure indicating unit $a$ may of course be located at any other suitable point of rod 6, between shock absorber 8 and lever 9, for example, or be incorporated in the suspension of the adjustable roll 10 or the supporting gear of stationary roll 11, care being taken to give it an appropriate shape, having regard to the location selected.

It will be readily understood that the casing of the pressure indicating device may be of any suitable shape. More particularly, it may be formed to constitute the bed of a bearing or of a step bearing, or itself to act as a stop or the like.

I claim:

1. In a static pressure indicating device, the combination of a flexible container filled with liquid, a pressure gauge communicating with said container, and a rigid flat-bottomed casing comprising an outer member and an inner member of cup-shaped form, adapted freely to reciprocate within each other and accommodating each a portion of said flexible container, the walls of said inner member being of tapered cross-section.

2. In a static pressure indicating device, the combination of a flexible container filled with liquid of annular shape, a pressure gauge communicating with said container, and a rigid casing enclosing said container, said casing comprising two annular shells of substantially U-shaped cross-section slidably engaging each other, said shells being adapted to accommodate each a portion of said container.

3. In a static pressure indicating device, the combination of a flexible container filled with liquid of annular shape, a pressure gauge communicating with said container, and a rigid casing enclosing said container, said casing comprising an inner and an outer annular shell each of substantially U-shaped cross-section adapted each to accommodate a portion of said container, said inner shell having tapering walls and being adapted freely to reciprocate within said outer shell.

4. In a static pressure indicating device, the combination of a flexible container filled with liquid of annular shape, a pressure gauge communicating with said container, a rigid annular casing enclosing said container, said casing comprising an inner and an outer annular shell slidably fitting within each other, each of said shells having a substantially U-shaped cross-section, the inner wall of said outer shell forming a guiding surface, a pressure transmitting member bearing on one of said shells, a pressure transmitting member bearing on the other of said shells, one of said members being guided by said guiding surface.

ALBERT THOMAS HUGHES.